(12) United States Patent
Yang

(10) Patent No.: US 8,750,371 B2
(45) Date of Patent: Jun. 10, 2014

(54) METHOD AND APPARATUS FOR RATE CONTROL FOR MULTI-VIEW VIDEO CODING

(75) Inventor: Hua Yang, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 727 days.

(21) Appl. No.: 12/932,061

(22) Filed: Feb. 16, 2011

(65) Prior Publication Data

US 2011/0216820 A1 Sep. 8, 2011

Related U.S. Application Data

(60) Provisional application No. 61/306,818, filed on Feb. 22, 2010.

(51) Int. Cl.
*H04N 7/12* (2006.01)
*H04N 11/02* (2006.01)
*H04N 11/04* (2006.01)

(52) U.S. Cl.
USPC ............ 375/240.02; 375/240.26; 375/240.13; 375/240.03; 375/240.12

(58) Field of Classification Search
CPC ..... H04N 7/24; H04N 7/26; H04N 19/00321; H04N 19/00181; H04N 19/0009
USPC ........................ 375/240.02, 240.26
See application file for complete search history.

(56) References Cited

U.S. PATENT DOCUMENTS

| | | | |
|---|---|---|---|
| 6,151,362 A * | 11/2000 | Wang ..................... | 375/240.12 |
| 6,895,054 B2 * | 5/2005 | Li ............................ | 375/240.13 |
| 2013/0028316 A1 * | 1/2013 | Leontaris et al. ......... | 375/240.03 |

OTHER PUBLICATIONS

Chiang et al., "A New Rate Control Scheme Using Quadratic Rate Distortion Model", IEEE Transactions on Circuits System Video Technology, vol. 7, Feb. 1997, pp. 246-250.
He et al., "Optimum Bit Allocation and Accurate Rate Control for Video Coding via p-Domain Source Modeling", IEEE Transactions on Circuits and Systems for Video Technology, vol. 12, No. 10, Oct. 2002.
Ribas-Corbeara et al., "Rate Control in DCT Video Coding for Low-Delay Communications", IEEE Transactions on Circuits and Systems for Video Technology, vol. 9, No. 1, Feb. 1999.
ITU-T H.264 Standard, "Advanced Video Coding for Generic Audio-visual Services", International Telecommunication Union, Mar. 2009.

* cited by examiner

*Primary Examiner* — Hee-Yong Kim
(74) *Attorney, Agent, or Firm* — Robert D. Shedd; Paul P. Kiel

(57) ABSTRACT

A method and apparatus are disclosed and described for providing rate control for multi-view video coding. The apparatus includes an encoder (100) for encoding image data for at least one picture for at least two joint views of multi-view video content. The at least two joint views include a base view and at least one dependent view. A bit allocation for encoding the image data is determined based on bit rate requirements for the base view and bit rate requirements for the at least two joint views.

18 Claims, 5 Drawing Sheets

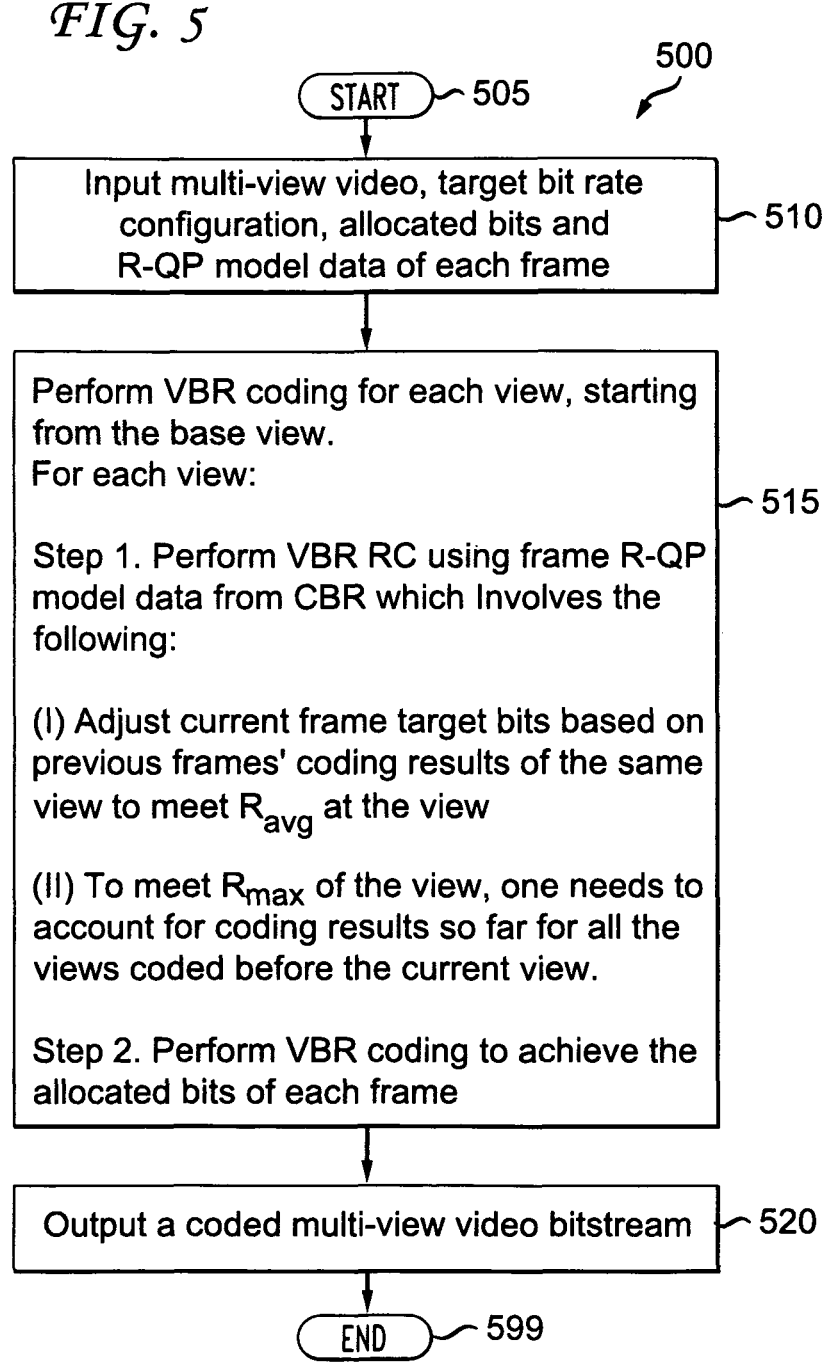

ical Field

The present principles relate generally to video encoding and, more particularly, to a method and apparatus for rate control for multi-view video coding.

BACKGROUND

Recently, multi-view coded video (MVC) has been widely recognized as one of the more promising trends of video oriented applications, and became an important focus in many video related industries, for example, entertainment, TV, multimedia, and so forth. Multi-view video coding (MVC) is the compression framework for the encoding of multi-view sequences. A Multi-view Video Coding (MVC) sequence is a set of two or more video sequences that capture the same scene from a different view point. When looking for standards in which to code multi-view content, one such available standard is the MVC extension of the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"). Furthermore, development of other advanced multi-view video coding standards are also currently being explored and developed.

In a multi-view video coding context, the goal of rate control (RC) becomes more complicated and complex than that of the conventional single view two-dimensional (2D) video coding. In the single view context, one needs to optimize the coding performance of one set of two-dimensional images only. However, in the case of multi-view video coding, one needs to not only optimize the overall coding performance of all the views together (referred to interchangeably herein as the "joint view" or "joint views"), but also needs to satisfy other possible bit rate constraints from particular views separately and in addition to the joint view. In particular, one example of such single view requirements is the separate and explicit bit rate requirements for the base view video. With such single view requirements, one can ensure some guarantee on the base view coding quality, which is highly desirable and important in practice. Since there will still be quite a lot customers using conventional two-dimensional video services who will see the base view video only, a service provider has to make sure the new multi-view video coding service will not compromise their quality of service for the two-dimensional video customers. How to balance the goal of joint view optimality with the base view constraint is a new rate control problem for multi-view video coding.

Existing rate control schemes all target conventional single view 2D video coding. Different rate control schemes can be categorized by their adopted different bit rate models, i.e., R-QP relationships; where R denotes the bit rate of a coding unit such as, for example, a frame, macroblock, and so forth, and QP denotes the quantization parameter of the coding unit.

A well-known and widely used model is a quadratic R-QP model, for example, used in MPEG-2 Test Model Version 5 (TM5). Another model is ITU H.263 Test Model, Near Term Version 8 (TMN8) rate control. Additionally, and more recently, improved and more accurate R-$\rho$-QP models have been introduced, i.e., the so called $\rho$-domain model. In addition, rate control schemes can also be categorized by (i) targeting constant bit rate (CBR) coding or variable bit rate (VBR) coding, and (ii) targeting real-time coding and hence preferring single-pass coding or offline coding and thus allowing for multi-pass coding, and so forth.

We emphasize that beyond all these type differences, all these existing schemes were originally developed for single-view video coding, which optimizes the coding performance of one single view of 2D video only. However, the emergence of MVC video poses a new and more complicated rate control problem, due to the presence of multiple views of 2D videos to be coded at the same time. Specifically, besides the goal of performance optimality of the joint view, i.e., with all the single views included, some views may have their own coding constraints in particular. Especially for the base view, a separate set of coding bit rate constraints has to be met in practice to ensure the new multi-view video coding service will not yield degraded quality of service for the legacy two-dimensional video coding.

SUMMARY

These and other drawbacks and disadvantages of the prior art are addressed by the present principles, which are directed to a method and apparatus for rate control for multi-view video coding.

According to an aspect of the present principles, there is provided an apparatus. The apparatus includes an encoder for encoding image data for at least one picture for at least two joint views of multi-view video content. The at least two joint views include a base view and at least one dependent view. A bit allocation for encoding the image data is determined based on bit rate requirements for the base view and bit rate requirements for the at least two joint views.

According to another aspect of the present principles, there is provided a method in a video encoder. The method includes encoding image data for at least one picture for at least two joint views of multi-view video content. The at least two joint views include a base view and at least one dependent view. A bit allocation for encoding the image data is determined based on bit rate requirements for the base view and bit rate requirements for the at least two joint views.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 5 is a flow diagram showing an exemplary method for performing variable bit rate coding to achieve an allocated number of bits of each frame, in accordance with an embodiment of the present principles.

DETAILED DESCRIPTION

Figure 1:
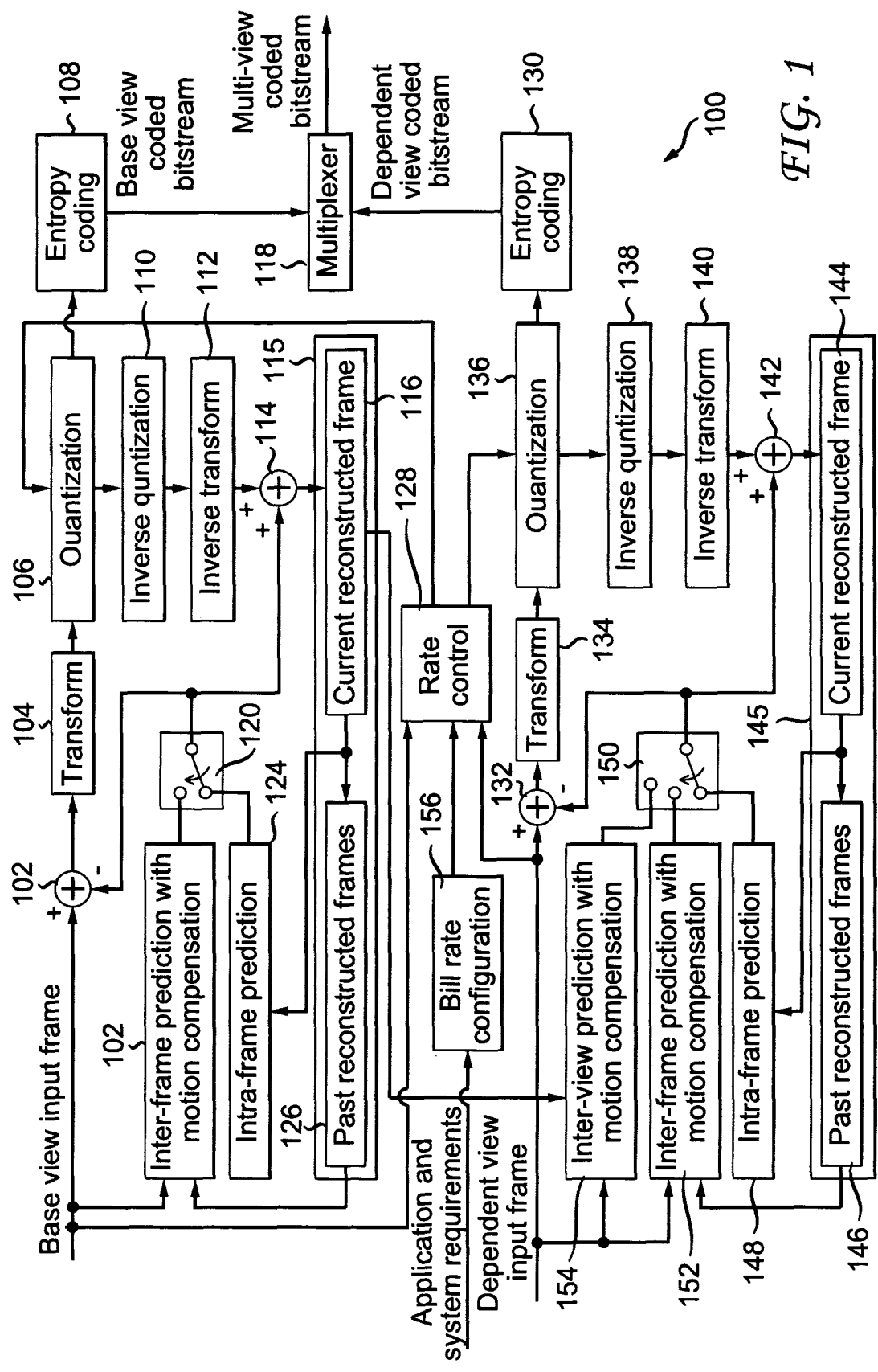
FIG. 1 is a block diagram showing an exemplary multi-view video encoder, in accordance with an embodiment of the present principles.

The present principles are directed to a method for rate control for multi-view video coding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, the phrases "joint view" and "joint views" are interchangeably used herein to collectively refer to all views of a particular multi-view video coding content.

Moreover, as used herein, the phrase "view sequential" when used, for example, with respect to a VBR or CBR frame-level bit allocation (FBA), refers to the sequential processing of each view, on a frame level, relating to VBR or CBR encoding. Embodiments of the present principles may involve a combination of non-view sequential and view sequential processing. Thus, for example, an embodiment of the present principles may involve, for example, processing all of the singular views comprised in a joint view together and collectively (i.e., non-view sequential processing), and then process each single view comprised in the joint view sequentially and individually (i.e., view sequential processing).

Further, as used herein, the phrase "actual resultant" when used, for example, with respect to "average bit rate for the base view", refers to the actual average bit rate that is obtained for the base view in an actual implementation.

Turning to FIG. 1, an exemplary multi-view video encoder is indicated generally by the reference numeral 100. The video encoder 100 includes a combiner 102 having an output connected in signal communication with an input of a transformer 104. An output of the transformer 104 is connected in signal communication with a first input of a quantizer 106. A first output of the quantizer 106 is connected in signal communication with an input of an inverse quantizer 110. An output of the inverse quantizer 112 is connected in signal communication with an input of an inverse transformer 112. An output of the inverse transformer 112 is connected in signal communication with a first non-inverting input of a combiner 114. An output of the combiner 114 is connected in signal communication with an input of a buffer 115. The buffer 115 stores a current reconstructed frame 116 output from the combiner 114 as well as past reconstructed frames 126 previously output from the combiner 114. A first output of the buffer 115 is connected in signal communication with an input of an intra-frame predictor 124. A second output of the buffer 115 is connected in signal communication with a first input of an inter-frame predictor with motion compensation 122. An output of the intra-frame predictor 126 is connected in signal communication with a first input of a switch 120. An output of the inter-frame predictor with motion compensation 122 is connected in signal communication with a second input of the switch 120. An output of the switch 120 is connected in signal communication with an inverting input of the combiner 102 and a second non-inverting input of the combiner 114. A second output of the quantizer 106 is connected in signal communication with an input of an entropy coder 108. An output of the entropy coder 108 is connected in signal communication with a first input of a multiplexer 118.

An output of a bit rate configurer 156 is connected in signal communication with a first input of a rate controller 128. A first output of the bit rate configure 156 is connected in signal communication with a second input of the quantizer 106. A second output of the rate controller 128 is connected in signal communication with a first input of a quantizer 136. A first output of the quantizer 136 is connected in signal communication with an input of an entropy coder 130. An output of the entropy coder 130 is connected in signal communication with a second input of the multiplexer 118. A second output of the quantizer 136 is connected in signal communication with an input of an inverse quantizer 138. An output of the inverse quantizer 138 is connected in signal communication with an input of an inverse transformer 140. An output of the inverse transformer 140 is connected in signal communication with a first non-inverting input of a combiner 142. An output of the combiner 142 is connected in signal communication with an input of a buffer 145. A first output of the buffer 145 is connected in signal communication with an input of an intra-frame predictor 148. An output of the intra-frame predictor 148 is connected in signal communication with a first input of a switch 150. A second output of the buffer 145 is connected in signal communication with a first input of an inter-frame predictor with motion compensation 152. An output of the inter-frame predictor with motion compensation 152 is connected in signal communication with a second input of the switch 150. A third output of the buffer 115 is connected in signal communication with a first input of an inter-view predictor with motion compensation 154. An output of the inter-view predictor with motion compensation 154 is connected in signal communication with a third input of the switch 150. An output of the switch 150 is connected in signal communication with an inverting input of a combiner 132 and a second non-inverting input of the combiner 142. An output of the combiner 132 is connected in signal communication with an input of a transformer 134. An output of the transformer 134 is connected in signal communication with an input of a quantizer 136.

A non-inverting input of the combiner 102, a second input of the inter-frame predictor with motion compensation 122, and a second input of the rate controller 128 are available as inputs of the MVC video encoder 100, for receiving a base view input frame. An input of the bit rate configure is available as an input of the MVC video encoder 100, for receiving application and system requirements. A third input of the rate controller 128, a non-inverting input of the combiner 132, a second input of the inter-view predictor with motion compensation 154, and a second input of the inter-view predictor with motion compensation 152 are available as inputs of the MVC encoder 100, for receiving a dependent view input frame. An output of the multiplexer 118 is available as an output of the MVC encoder 100, for outputting a multi-view coded bitstream.

As noted above, the present principles are directed to a method and apparatus for rate control for multi-view video coding. We have realized that for multi-view video coding, a jointly optimized rate control for the joint view will yield global optimization of the overall coding performance, but it may be difficult to satisfy independent single view specific constraints. On the other hand, one may first optimize rate control for those single views with special constraints, and then jointly optimize all the remaining single views together afterwards. However, directly going for this view sequential optimization scheme will exclude the checking of jointly optimized rate control, whose result may sometimes meet the single view constraints as well and hence, provide the true global optimal solution in such a case.

Thus, as we previously described, in multi-view video coding (MVC), the goal of rate control (RC) becomes more complicated than that of conventional single view 2D video coding. Unlike in the single view case, where single view video coding optimality is the only goal, in the case of multi-view video coding, one needs to not only strive for global optimal coding performance for all the views altogether, referred to interchangeably herein as the "joint view" or "joint views", but also guarantee some explicit coding requirements for some particular views to be met with at the same time. Especially, in practice, besides the joint view bit rate requirements, we also have independent requirements for the base view which serve to ensure base view coding quality such that the performance of conventional 2D video related services is not compromised in the new multi-view video applications. Therefore, in accordance with the present principles, we disclose an optimized rate control framework to fulfill such tasks for multi-view video coding. It involves both jointly optimized frame-level bit allocation (FBA) for the joint view and the sequentially optimized FBAs for each single view respectively, and properly decides which scheme of the two to use, according to the fulfillment of bit rate requirements of both the base view and the joint view via trying out the jointly optimized FBA approach first. Superior coding performance can be achieved by our comprehensive and optimized multi-view video coding rate control framework, compared to prior art solutions that only rely upon either one of the two involved rate control schemes.

Note that the proposed solution is a rate control framework for multi-view video coding. The proposed solution differs from all the existing single view video rate control schemes in that it addresses the new multi-view video coding rate control problem with more complicated coding constraints than that for conventional single view 2D video coding. This means that the proposed solution can be applied with any of the existing R-QP models, either constant bit rate or variable bit rate coding, and either real-time single pass coding or offline multi-pass coding, and so forth.

We first formulate the concerned multi-view video coding rate control problem as a frame-level bit allocation (FBA) and achievement problem with bit rate configuration or constraints of four parameters, i.e., average and maximum bit rates of the base view and the joint view, denoted by $R_{avg,base}$, $R_{max,base}$, $R_{avg,joint}$, and $R_{max,joint}$, respectively. Our generalized rate control framework can always yield optimized bit allocation for maximizing overall coding quality of multi-view video while satisfying all these four bit rate constraints.

Our method includes three major modules (or process subdivisions), namely a first pass constant bit rate coding for pre-analysis, a frame-level bit allocation for a second pass variable bit rate coding, and the second pass variable bit rate coding.

It is to be appreciated that while the present principles are primarily described herein regarding the use of variable bit rate coding as the final encoding pass, in practice, given the teachings of the present principles provided herein, one of ordinary skill in this and related arts will readily recognize that the proposed general rate control framework can also be readily employed for constant bit rate coding scenarios. Since even in the case of constant bit rate coding, one can still pre-allocate a total bit budget for a certain allowable section of consecutive frames to meet a CBR constraint and, then, conduct VBR control and coding for the section of frames so as to achieve good perceptual coding quality of the section. In practice, this section of frames could be one or several group-of-pictures (GOPs). On the other hand, in the case of variable bit rate coding, one can conduct VBR rate control and coding for the whole video sequence for good coding quality of the sequence.

Figure 2:
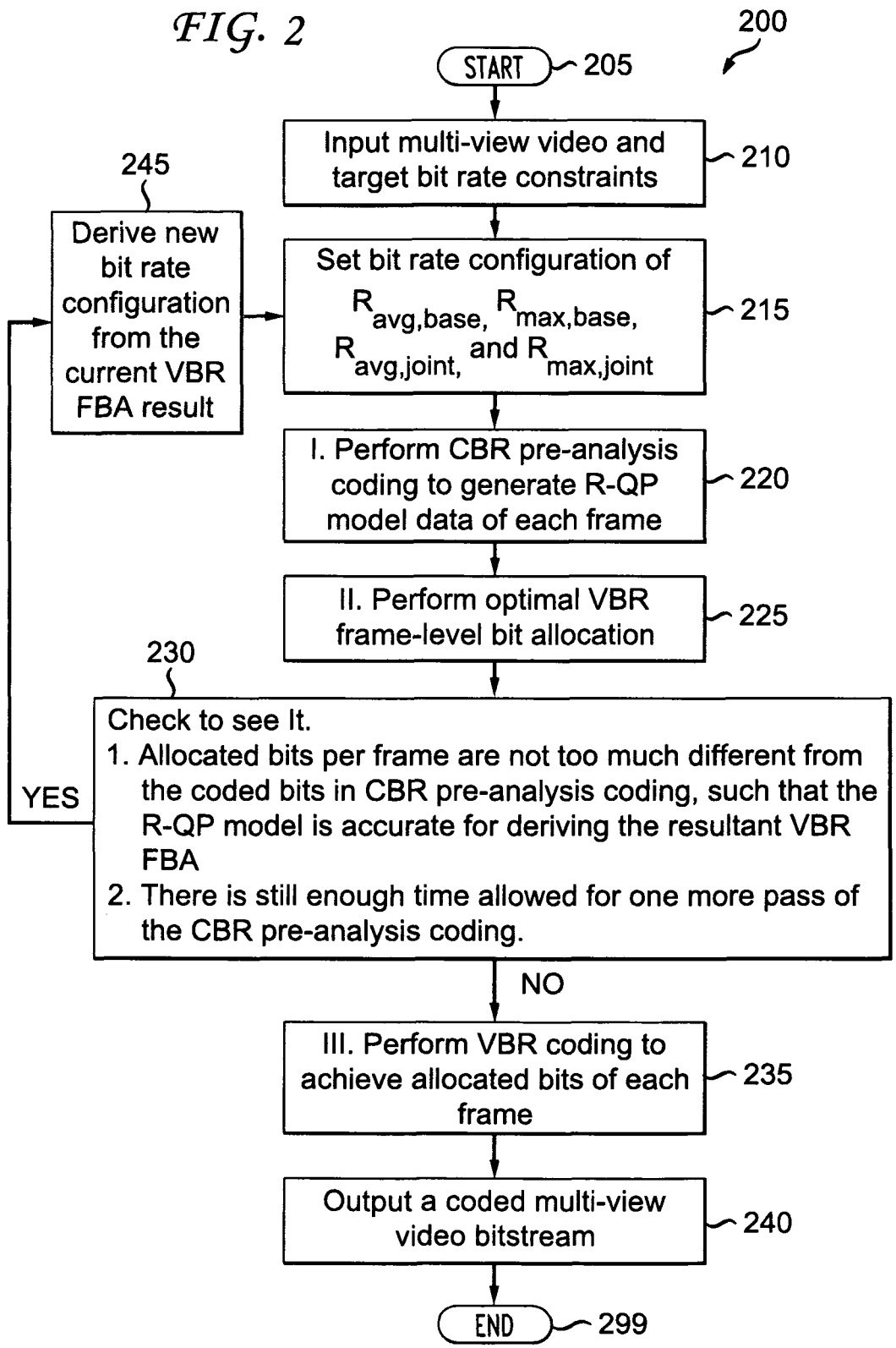
FIG. 2 is a flow diagram showing an exemplary method for multi-view video coding rate control, in accordance with an embodiment of the present principles.

Turning to FIG. 2, an exemplary method for multi-view video coding rate control is indicated generally by the reference numeral 200. The method 200 includes a start block 205 that passes control to a function block 210. The function block 210 inputs multi-view video and target bit rate constraints, and passes control to a function block 215. The function block 215 sets the bit rate configuration of $R_{avg,base}$, $R_{max,base}$, $R_{avg,joint}$, and $R_{max,joint}$, and passes control to a function block 220. The function block 220 performs a constant bit rate pre-analysis coding to generate R-QP model data of each frame, and passes control to a function block 225. The function block 225 determines the optimal variable bit rate frame-level bit allocation, and passes control to a decision block 230. The decision block 230 verifies whether (1) the allocated bits per frame are not too much different from the coded bits in a constant bit rate pre-analysis coding, such that the R-QP model is accurate for deriving the resultant variable bit rate frame-level bit allocation; and (ii) there is still enough time allowed for one more pass of CBR pre-analysis coding. If so, then control is passed to a function block 245. Otherwise, control is passed to a function block 235. The function block 245 derives a new bit rate configuration from the current variable bit rate frame-level bit allocation result, and returns control to the function block 215. The function block 235 performs variable bit rate coding to achieve the allocated number of bits of each frame, and passes control to a function block 240. The function block 240 outputs a coded multi-view video bit stream, and passes control to an end block 299.

We initially point out the Roman numerals I, II, and III present in the function blocks 220, 225, and 235, respectively. Such numerals 220, 225, and 235 represent three primary steps involved in an embodiment of the present principles and are further described in detail regarding FIGS. 3, 4, and 5, respectively.

FIG. 2 shows that our multi-view video coding rate control framework is a two pass coding framework. The first constant bit rate coding pass of pre-analysis is to collect R-QP model data of each frame. Then, this data is used in the optimal variable bit rate frame-level bit allocation to calculate the allocated bits of each frame. Finally, the second variable bit rate coding pass actually encodes the input multi-view video and produces the coded multi-view video coding bit streams according to the optimally allocated bit rate of each frame. Herein, after the optimal variable bit rate frame-level bit allocation, we will check whether the actual frame-level bit allocation result is too much different from the constant bit rate coding result. There are different possible ways to perform this check. For example, one may check whether the target quantization parameter of each frame from the variable bit rate frame-level bit allocation is close to the constant bit rate frame quantization parameter or not, or whether the variable bit rate target bits of a frame is close to the constant bit rate coded bits of the frame or not, and so forth. Basically, the purpose is to see whether the resultant frame R-QP model data from the constant bit rate pre-analysis is accurate enough to be used for the variable bit rate frame-level bit allocation. If variable bit rate frame-level bit allocation result is too much different from the constant bit rate coding result, then it is most likely that the frame R-QP modeling accuracy will be poor, which may greatly compromise the resultant variable bit rate frame-level bit allocation performance. If so, it would make sense to re-do the constant bit rate pre-analysis with the adjusted bit rate configurations based on the current round of variable bit rate frame-level bit allocation result, so as to produce more accurate frame R-QP model data. Ideally, the more iterative passes, the more accurate the modeling accuracy and, hence, the better the variable bit rate frame-level bit allocation optimality. However, in practice, there is always a limit on the maximum allowable coding time, depending on the actual specific application requirement. As such, where possible, it is suggested to conduct as many passes of the constant bit rate pre-analysis as possible, given any constraints such as a maximum number of iterations, resource consumption, and so forth. Hence, it fits for both real-time or offline MVC coding applications.

Figure 3:
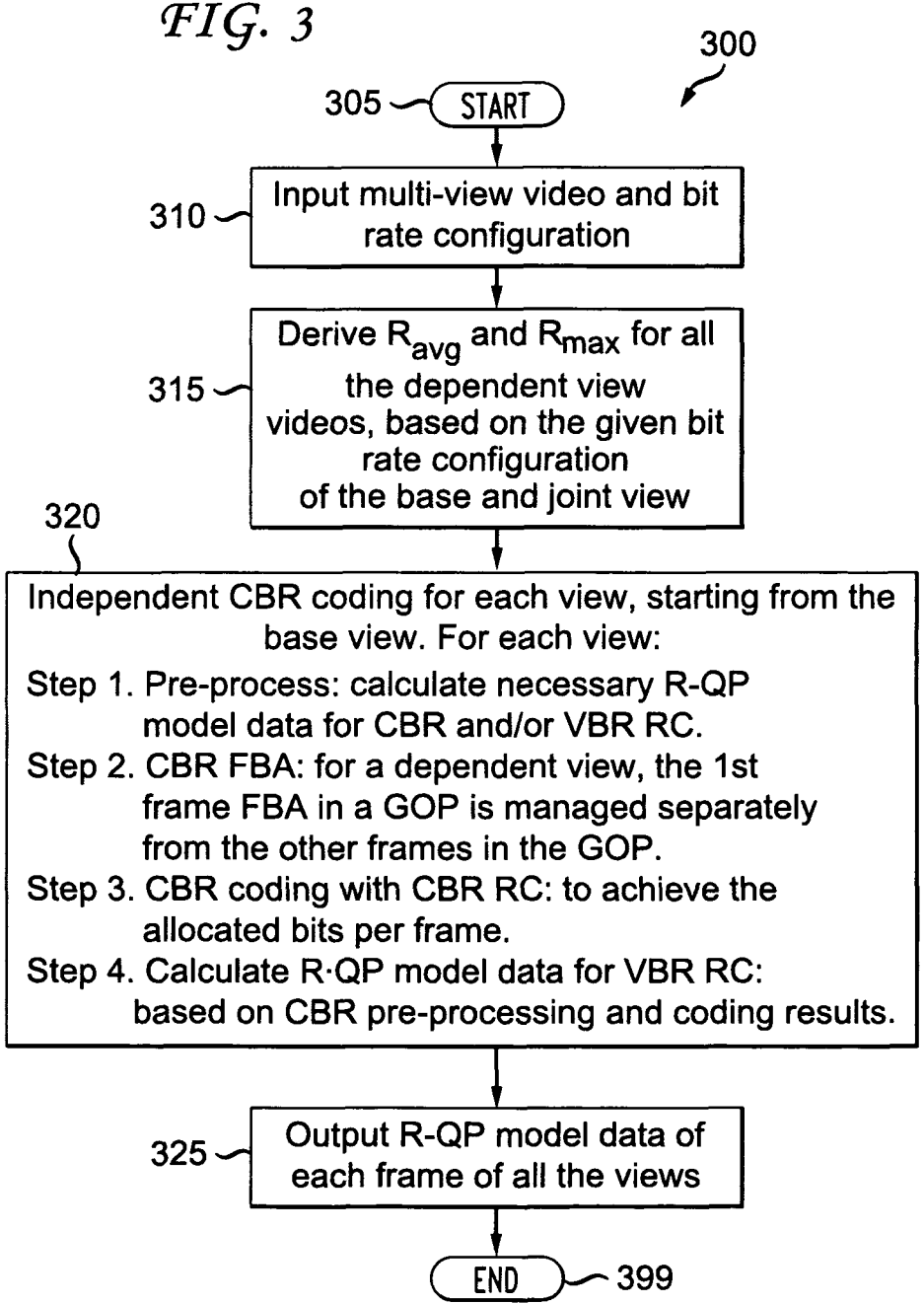
FIG. 3 is a flow diagram showing an exemplary method for constant bit rate pre-analysis coding, in accordance with an embodiment of the present principles.

Turning to FIG. 3, an exemplary method for constant bit rate pre-analysis coding is indicated generally by the reference numeral 300. The method 300 illustrates one possible way in which the function block 220 of FIG. 2 can perform a CBR pre-analysis in accordance with the present principles. Of course, given the teachings of the present principles provided herein, one of ordinary skill in this and related arts will contemplate these and various other ways in which to perform a CBR pre-analysis, while maintaining the spirit of the present principles. The method 300 includes a start block 305 that passes control to a function block 310. The function block 310 inputs multi-view video and a bit rate configuration, and passes control to a function block 315. The function block 315 derives $R_{avg}$ and $R_{max}$ for all the dependent view videos, based on the given bit rate configuration on the base and joint views, and passes control to a function block 320. The function block 320 performs an independent constant bit rate coding for each view starting from the base view, and passes control to a function block 325. Regarding the independent constant bit rate coding performed by the function block 320, for each view, the following steps are performed:

Step 1: Pre-process: calculate the necessary R-QP model data for CBR and/or VBR RC.

Step 2: CBR FBA: for a dependent view, the $1^{st}$ frame FBA in a GOP is managed separately from the other frames in the GOP.

Step 3: CBR coding with CBR RC: to achieve the allocated bits per frame.

Step 4: Calculate R-QP model data for VBR RC: based on CBR preprocess and coding results.

The function block 325 outputs the R-QP model data of each frame of all the views, and passes control to an end block 399.

We note that one problem solved in our multi-view video coding rate control framework is the derivation of $R_{avg}$ and $R_{max}$ for each dependent view, given $R_{avg,base}$, $R_{max,base}$, $R_{avg,joint}$, and $R_{max,joint}$. One such way to derive $R_{avg}$ and $R_{max}$ for each dependent view is as follows:

$$R_{avg,dpd,i} = \frac{(R_{avg,joint} - R_{avg,base})}{TotalViews - 1} \quad (1)$$

$$R_{max,dpd,i} = R_{avg,dpd,i} + \frac{\lfloor(R_{max,joint} - R_{avg,joint}) - (R_{max,base} - R_{avg,base})\rfloor}{TotalViews - 1} \quad (2)$$

where $R_{avg,dpd,i}$ and $R_{max,dpd,i}$ denote the average and maximum bit rate constraints for the $i^{th}$ dependent view, respectively, and TotalViews denote the total number of all the views. Note that herein for simplicity, we assume that all the dependent views are of the same importance, i.e., there is no preference on one particular dependent view coding performance over the others. In practice, it is possible that some dependent views may be more important than others for some reason including, but not limited to, for example, user preference, and so forth. In such a case, a proper set of weighting factors can be assigned for each dependent view, which can be easily integrated into Equations (1) and (2).

Another novelty relating to the CBR pre-analysis coding is the separate CBR FBA management for the $1^{st}$ frame of a dependent view GOP. That frame is a frame with inter-frame prediction, and hence, either a P- or a B-frame, where a P-frame indicates a predictively coded frame and a B-frame indicates a bi-predictively coded frame. Unlike the other inter-frames in the GOP, which allow both inter-view prediction and conventional temporal prediction from previous coded frames in the same view, this $1^{st}$ inter-frame in a dependent view GOP only allows the inter-view prediction mode, which is particularly defined for the MVC extension of the MPEG-4 AVC Standard. Therefore, its prediction characteristic is different from that of the other remaining frames in the GOP. In practice, separately managing its constant bit rate frame-level bit allocation, for example, with separate rate modeling parameters, is favorable for better overall CBR RC performance.

Figure 4:
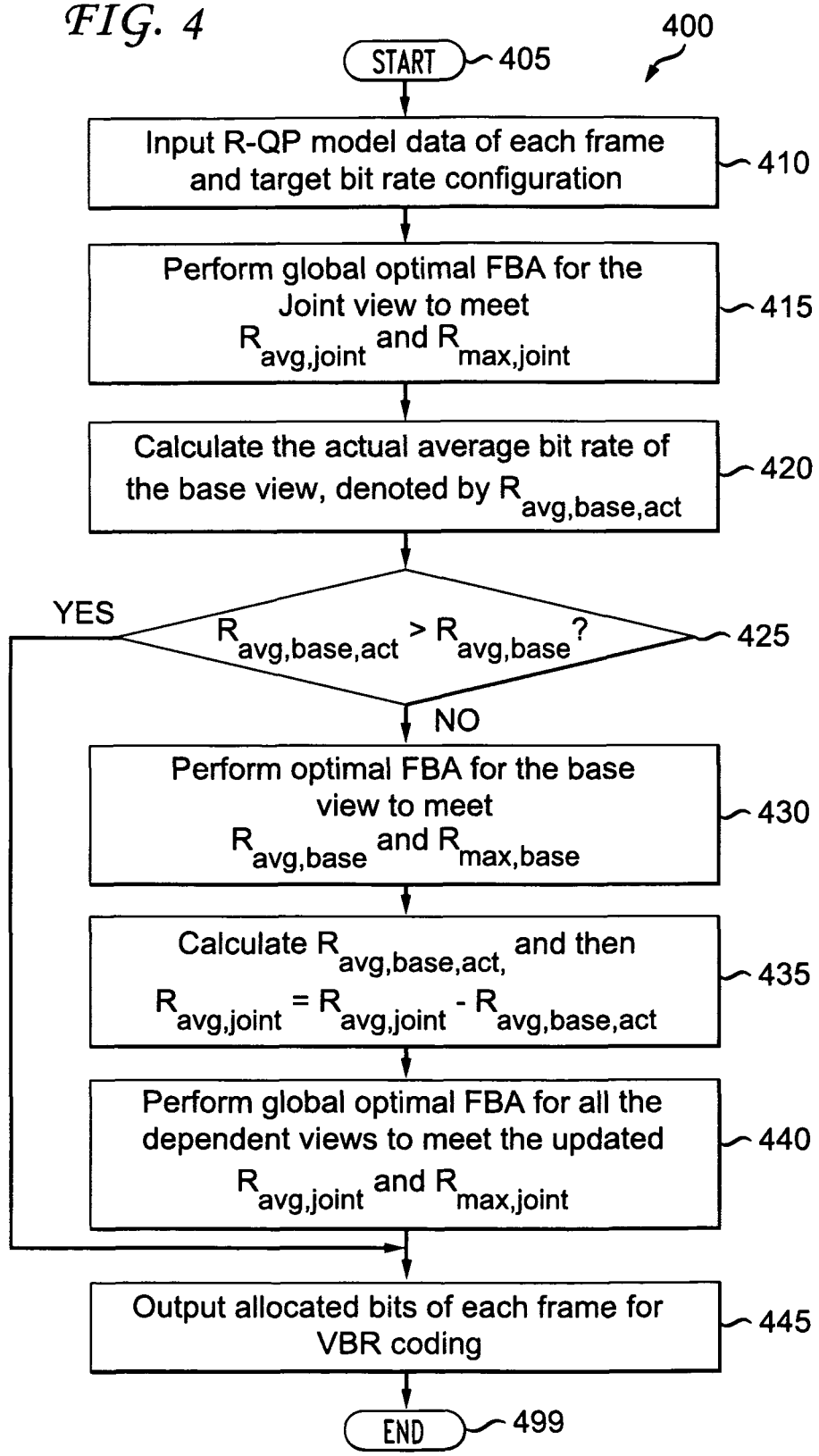
FIG. 4 is a flow diagram showing an exemplary method for determining an optimal variable bit rate frame-level bit allocation, in accordance with an embodiment of the present principles.

Turning to FIG. 4, an exemplary method for determining an optimal variable bit rate frame-level bit allocation is indicated generally by the reference numeral 400. The method 400 illustrates one possible way in which the function block 225 of FIG. 2 can determine the optimal variable bit rate frame-level bit allocation in accordance with the present principles. Of course, given the teachings of the present principles provided herein, one of ordinary skill in this and related arts will contemplate these and various other ways in which to determine the optimal variable bit rate frame-level bit allocation, while maintaining the spirit of the present principles. The method 400 includes a start block 405 that passes control to a function block 410. The function block 410 inputs the R-QP model data of each frame and the target bit rate configuration, and passes control to a function block 415. The function block 415 determines the global optimal FBA for the joint view to meet $R_{avg,joint}$ and $R_{max,joint}$, and passes control to a function block 420. The function block 420 calculates the actual average bit rate of the base view, denoted by $R_{avg,base, act}$, and passes control to a decision block 425. The decision block 425 determines whether or not $R_{avg,base, act} > R_{avg,base}$. If so, then control is passed to a function block 445. Otherwise, control is passed to a function block 430. The function block 445 allocates the bits of each frame for VBR coding, and passes control to an end block 499. The function block 430 determines the optimal FBA for the base view to meet $R_{avg,base}$, $R_{max,base}$, and passes control to a function block 435. The function block 435 calculates $R_{avg,base, act}$, thereafter calculates, $R_{avg,joint} = R_{avg,joint} - R_{avg,base, act}$, and passes control to a function block 440. The function block 440 determines the global FBA for all the dependent views to meet updated $R_{avg,joint}$ and $R_{max,joint}$, and passes control to the function block 445.

Further regarding FIG. 4, we first conduct a global optimal FBA for all the views, i.e. the joint view, to meet the joint view coding constraints of $R_{avg,joint}$ and $R_{max,joint}$. Then, we check whether or not this global optimal FBA result satisfies the base view coding constraints as well. This is done by comparing the actual $R_{avg,base}$ from the global optimal FBA, denoted as $R_{avg,base, act}$, with the original $R_{avg,base}$. If $R_{avg,base, act}$ is greater than $R_{avg,base}$, then such a condition implies that the global optimal result already renders a base view coding performance better than the original target. In this case, we can just take the global optimal FBA as the final result. Otherwise, the global optimal result does not meet the base view coding constraint and, thus, we will further conduct a view sequential optimized VBR FBA. In this case, an optimal VBR FBA is first conducted for only the base view to meet its particular coding constraints of $R_{avg,base}$, $R_{max,base}$, and then, from this optimal base view FBA result, we derive $R_{avg,base, act}$ and then update $R_{avg,joint}$ with the derived $R_{avg,base, act}$ as shown in FIG. 4. Finally, we conduct another optimal VBR FBA with all the dependent views included to meet the updated $R_{avg,joint}$ and $R_{max,joint}$. Note that to meet $R_{max,joint}$, we need to add up the allocated bits of a frame of all the dependent views together with the previous allocated base view bits of the same frame, and make sure that the resultant total bits per frame of all the frames satisfy the $R_{max,joint}$ constraint.

We can see that the proposed MVC VBR FBA approach properly combines the joint view optimal FBA with the view sequential optimal FBA, and the resultant FBA always represents the best achievable, optimal solution, given our special MVC coding constraint formulated with $R_{avg,base}$, $R_{max,base}$, $R_{avg,joint}$, and $R_{max,joint}$. Note that we propose a general framework, where the involved optimal VBR FBA could be embodied in many different ways including, but not limited to, for example, with different R-QP modeling (e.g., either quadratic R-QP modeling or R-ρ-QP modeling), different optimization criterion (e.g., to maximize quality one may minimize the average distortion of all the frames, minimize the maximum frame distortion of all the frames, or minimize the constant quantization parameter of all the frames, and so forth), and different optimization algorithms (i.e., different search algorithms for optimal rate control parameters).

Turning to FIG. 5, an exemplary method for performing variable bit rate coding to achieve an allocated number of bits of each frame is indicated generally by the reference numeral 500. The method 500 illustrates one possible way in which the function block 235 of FIG. 2 can perform VBR coding to achieve the allocated number of bits of each frame in accordance with the present principles. Of course, given the teachings of the present principles provided herein, one of ordinary skill in this and related arts will contemplate these and various other ways in which to perform VBR coding to achieve the allocated number of bits of each frame, while maintaining the spirit of the present principles. The method 500 includes a start block 505 that passes control to a function block 510.

The function block 510 inputs multi-view video, a target bit rate configuration allocated bits and R-QP model data of each frame, and passes control to a function block 515. The function block 515 performs VBR coding for each view, starting from the base view, and passes control to a function block 520.

Regarding the VBR coding performed by the function block 515, for each view, the following steps are performed:

Step 1: Perform VBR RC using the frame R-QP data from CBR which includes the following:
  (i) Adjust the current frame target bits based on the coding results of the previous frames of the same view to meet $R_{avg}$ of the view.
  (ii) To meet $R_{max}$ of the view, one needs to account for coding results so far for all the views coded before the current view.

Step 2: Perform VBR coding to achieve the allocated bits of each frame.

The function block 520 outputs the coded multi-view video bit streams, and passes control to an end block 599.

We note that one problem solved by method 500 is the fulfillment of $R_{max}$. When coding each dependent view frame, one needs to account for coding result of all the coded views before the current view, as follows:

$$\left( R_{1sec,base}(j) + \sum_{index=1}^{i} R_{1sec,dpd,index}(j) \right) \leq R_{1sec,max,dpd,i} \quad (3)$$

where $R_{1sec,view}(j)$ denotes the total frame bits of all the frames in the one second sliding window that ends at the current frame, indexed by j, of the current view, indexed by "view". "view" could be "base" for the base view, or "dpd, i" for the $i^{th}$ dependent view. $R_{1sec,max, dpd, i}$ denotes the maximum bit limit for a 1 second bit check at the $i^{th}$ dependent view, which equals the number of frames in 1 second (of one view), i.e., 1 divided by the frame rate, multiplying with $R_{max, dpd, i}$ as derived in Equation (2). In practice, to support $R_{max}$ as shown in Equation (3), one needs to implement inter-view communication to inform the result of the lower index views to the higher index views.

A description will now be given of some of the many attendant advantages/features of the present invention, some of which have been mentioned above. For example, one advantage/feature is an apparatus having an encoder for encoding image data for at least one picture for at least two joint views of multi-view video content. The at least two joint views include a base view and at least one dependent view. A bit allocation for encoding the image data is determined based on bit rate requirements for the base view and bit rate requirements for the at least two joint views.

Another advantage/feature is the apparatus having the encoder as described above, wherein the bit rate requirements for the base view include an average bit rate and a maximum bit rate for the base view, and the bit rate requirements for the at least two joint views include the average bit rate and the maximum bit rate for the at least two joint views.

Yet another advantage/feature is the apparatus having the encoder as described above, wherein the bit allocation for encoding the image data is determined using a variable bit rate frame-level bit allocation approach that is responsive to the bit rate requirements for the base view and the bit rate requirements for the at least two joint views, the variable bit rate frame-level bit allocation combining a frame-level bit allocation for the joint views with a view sequential frame-level bit allocation for each single view of the joint views.

Still another advantage/feature is the apparatus having the encoder as described above, wherein a rate model accuracy check is conducted after the variable bit rate frame-level bit allocation by comparing a difference between a result of the variable bit rate frame-level bit allocation and a result of a constant bit rate pre-analysis, the constant bit rate pre-analysis used to collect rate modeling data for each of the at least one picture for the at least two joint views.

A further advantage/feature is the apparatus having the encoder wherein a rate model accuracy check is conducted after the variable bit rate frame-level bit allocation by comparing a difference between a result of the variable bit rate frame-level bit allocation and a result of a constant bit rate pre-analysis, the constant bit rate pre-analysis used to collect rate modeling data for each of the at least one picture for the at least two joint views as described above, wherein the constant bit rate pre-analysis involves deriving dependent view coding constraints from the bit rate requirements for the base view and the bit rate requirements for the joint views.

Moreover, another advantage/feature is the apparatus having the encoder wherein the constant bit rate pre-analysis involves deriving dependent view coding constraints from the bit rate requirements for the base view and the bit rate requirements for the joint views as described above, wherein the constant bit rate pre-analysis separately manages a rate control of a first frame in a dependent view group of pictures corresponding to at least one of the at least one dependent view as compared to other frames in the group of pictures to improve a constant bit rate rate control performance, the first frame being separately managed using different modeling parameters than the other frames in the group of pictures.

Further, another advantage/feature is the apparatus having the encoder wherein the bit allocation for encoding the image data is determined using a variable bit rate frame-level bit allocation approach that is responsive to the bit rate requirements for the base view and the bit rate requirements for the at least two joint views, the variable bit rate frame-level bit allocation combining a frame-level bit allocation for the joint views with a view sequential frame-level bit allocation for each single view of the joint views as described above, wherein the frame-level bit allocation for the joint views comprises a variable bit rate frame-level bit allocation for the joint views.

Also, another advantage/feature is the apparatus having the encoder wherein the bit allocation for encoding the image data is determined using a variable bit rate frame-level bit allocation approach that is responsive to the bit rate requirements for the base view and the bit rate requirements for the at least two joint views, the variable bit rate frame-level bit allocation combining a frame-level bit allocation for the joint views with a view sequential frame-level bit allocation for each single view of the joint views as described above, wherein a check is performed to determine whether the variable bit rate frame-level bit allocation for the joint views also satisfies the bit rate requirements for the base view by comparing an actual resultant average bit rate for the base view with an original target average bit rate for the base view.

Additionally, another advantage/feature is the apparatus having the encoder wherein the bit allocation for encoding the image data is determined using a variable bit rate frame-level bit allocation approach that is responsive to the bit rate requirements for the base view and the bit rate requirements for the at least two joint views, the variable bit rate frame-level bit allocation combining a frame-level bit allocation for the joint views with a view sequential frame-level bit allocation for each single view of the joint views as described above, wherein the view sequential frame-level bit allocation for each single view of the joint views is conducted only if the frame-level bit allocation for the joint views fails to meet the bit rate requirements for the base view.

Moreover, another advantage/feature is the apparatus having the encoder wherein the view sequential frame-level bit allocation for each single view of the joint views is conducted only if the frame-level bit allocation for the joint views fails to meet the bit rate requirements for the base view as described above, wherein the view sequential frame-level bit allocation for each single view of the joint views involves performing a frame-level bit allocation for the base view followed by a joint frame-level bit allocation for all of the at least one dependent view.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
an encoder for encoding image data for at least one picture for at least two joint views of multi-view video content, the at least two joint views including a base view and at least one dependent view, wherein a bit allocation for encoding the image data is determined based on bit rate requirements for the base view and bit rate requirements for the at least two joint views,
wherein a rate model accuracy check is conducted after a variable bit rate frame-level bit allocation by comparing a difference between a result of the variable bit rate frame-level bit allocation and a result of a constant bit rate pre-analysis, the constant bit rate pre-analysis used to collect rate modeling data for each of the at least one picture for the at least two joint views.

2. The apparatus of claim 1, wherein the bit rate requirements for the base view comprise an average bit rate and a maximum bit rate for the base view, and the bit rate requirements for the at least two joint views comprise the average bit rate and the maximum bit rate for the at least two joint views.

3. The apparatus of claim 1, wherein the bit allocation for encoding the image data is determined using the variable bit rate frame-level bit allocation approach that is responsive to the bit rate requirements for the base view and the bit rate requirements for the at least two joint views, the variable bit rate frame-level bit allocation combining a frame-level bit allocation for the joint views with a view sequential frame-level bit allocation for each single view of the joint views.

4. The apparatus of claim 1, wherein the constant bit rate pre-analysis involves deriving dependent view coding constraints from the bit rate requirements for the base view and the bit rate requirements for the joint views.

5. The apparatus of claim 4, wherein the constant bit rate pre-analysis separately manages a rate control of a first frame in a dependent view group of pictures corresponding to at least one of the at least one dependent view as compared to other frames in the group of pictures to improve a constant bit rate control performance, the first frame being separately managed using different modeling parameters than the other frames in the group of pictures.

6. The apparatus of claim 3, wherein the frame-level bit allocation for the joint views comprises a variable bit rate frame-level bit allocation for the joint views.

7. The apparatus of claim 3, wherein a check is performed to determine whether the variable bit rate frame-level bit allocation for the joint views also satisfies the bit rate requirements for the base view by comparing an actual resultant average bit rate for the base view with an original target average bit rate for the base view.

8. The apparatus of claim 3, wherein the view sequential frame-level bit allocation for each single view of the joint views is conducted only if the frame-level bit allocation for the joint views fails to meet the bit rate requirements for the base view.

9. The apparatus of claim 8, wherein the view sequential frame-level bit allocation for each single view of the joint views involves performing a frame-level bit allocation for the base view followed by a joint frame-level bit allocation for all of the at least one dependent view.

10. In a video encoder, a method, comprising:
encoding image data for at least one picture for at least two joint views of multi-view video content, the at least two joint views including a base view and at least one dependent view, wherein a bit allocation for encoding the image data is determined based on bit rate requirements for the base view and bit rate requirements for the at least two joint views,
wherein a rate model accuracy check is conducted after a variable bit rate frame-level bit allocation by comparing a difference between a result of the variable bit rate frame-level bit allocation and a result of a constant bit rate pre-analysis, the constant bit rate pre-analysis used to collect rate modeling data for each of the at least one picture for the at least two joint views.

11. The method of claim 10, wherein the bit rate requirements for the base view comprise an average bit rate and a maximum bit rate for the base view, and the bit rate requirements for the at least two joint views comprise the average bit rate and the maximum bit rate for the at least two joint views.

12. The method of claim 10, wherein the bit allocation for encoding the image data is determined using the variable bit rate frame-level bit allocation that is responsive to the bit rate requirements for the base view and the bit rate requirements for the at least two joint views, the variable bit rate frame-level bit allocation combining a frame-level bit allocation for the joint views with a view sequential frame-level bit allocation for each single view of the joint views.

13. The method of claim 10, wherein the constant bit rate pre-analysis involves deriving dependent view coding constraints from the bit rate requirements for the base view and the bit rate requirements for the joint views.

14. The method of claim 13, wherein the constant bit rate pre-analysis separately manages a rate control of a first frame in a dependent view group of pictures corresponding to at least one of the at least one dependent view as compared to other frames in the group of pictures to improve a constant bit rate control performance, the first frame being separately managed using different rate modeling parameters than the other frames in the group of pictures.

15. The method of claim 12, wherein the frame-level bit allocation for the joint views comprises a variable bit rate frame-level bit allocation for the joint views.

16. The method of claim 12, wherein a check is performed to determine whether the variable bit rate frame-level bit allocation for the joint views also satisfies the bit rate requirements for the base view by comparing an actual resultant average bit rate for the base view with an original target average bit rate for the base view.

17. The method of claim 12, wherein the view sequential frame-level bit allocation for each single view of the joint views is conducted only if the frame-level bit allocation for the joint views fails to meet the bit rate requirements for the base view.

18. The method of claim 17, wherein the view sequential frame-level bit allocation for each single view of the joint views involves performing a frame-level bit allocation for the base view followed by a joint frame-level bit allocation for all of the at least one dependent view.

* * * * *